United States Patent [19]

Goto et al.

[11] Patent Number: 4,573,694
[45] Date of Patent: Mar. 4, 1986

[54] FUEL FILLER SYSTEM FOR AN AUTOMOTIVE VEHICLE

[75] Inventors: Shinji Goto, Chigasaki; Takao Kingo, Hadano; Akira Ochi; Yoshiro Yoshikawa, both of Hiratsuka, all of Japan

[73] Assignee: Nissan Shatai Company, Limited, Hiratsuka, Japan

[21] Appl. No.: 590,078

[22] Filed: Mar. 15, 1984

[30] Foreign Application Priority Data

Mar. 30, 1983 [JP] Japan ................... 58-52778

[51] Int. Cl.⁴ .............................................. B65D 25/40
[52] U.S. Cl. ................................. 280/5 A; 220/86 R
[58] Field of Search ............ 280/5 A, 5 R; 220/86 R; 296/1 C; 137/351

[56] References Cited

U.S. PATENT DOCUMENTS

| | | | |
|---|---|---|---|
| 1,875,908 | 9/1932 | Zarobsky | 220/86 R |
| 3,464,584 | 9/1969 | McNally | 220/86 R |
| 3,911,977 | 10/1975 | Berger | 141/348 |
| 4,027,910 | 6/1977 | Farelli | 280/5 A |
| 4,079,952 | 3/1978 | Nishio et al. | 220/86 R |
| 4,142,756 | 3/1979 | Henning et al. | 296/1 |
| 4,252,245 | 2/1981 | Kudo | 280/5 A |
| 4,448,323 | 5/1984 | Hayashi et al. | 280/5 A |

FOREIGN PATENT DOCUMENTS

| | | |
|---|---|---|
| 56-29216 | 7/1981 | Japan . |
| 57-151429 | 9/1982 | Japan . |
| 57-151430 | 9/1982 | Japan . |

*Primary Examiner*—Joseph F. Peters, Jr.
*Assistant Examiner*—Mark C. Dukes
*Attorney, Agent, or Firm*—Schwartz, Jeffery, Schwaab, Mack, Blumenthal & Evans

[57] ABSTRACT

A fuel filler system for an automotive vehicle includes a safety flange shielding the filler tube cap from the edges of the body panel opening through which the fuel filler tube passes. The flange may be threaded so as to be easily attached to or removed from the filler tube. Alternatively, an elastic seal may be installed to ensure a fluid-tight seal between the filler tube and the body panel. In addition, a second fluid-tight seal may be provided by a sealing member forming part of a bracket fixing the filler tube to the outside of the opening in the body panel.

6 Claims, 6 Drawing Figures

FUEL FILLER SYSTEM FOR AN AUTOMOTIVE VEHICLE

BACKGROUND OF THE INVENTION

1. Field of the Invention

The invention pertains to a fuel filler system in an automotive vehicle and more specifically to a safety structure shielding the sealing cap at the end of the fuel filler tube or hose from contact with nearby portions of the vehicle body in cases of vehicle collision or other serious vehicle body deformation.

2. Brief Description of the Prior Art

Recent developments in automotive safety have included attempts to minimize the danger to passengers and the damage to the vehicle in cases of traffic accidents. An important consideration in this regard is the possibility of fire due to fuel leakage. The fuel filler tube or hose leading from the gas or fuel cap to the fuel tank is preferably a cause of fuel leakage as its length makes it vulnerable to vehicle body damage.

Recently developed structures can adequately protect the point of connection between the filler tube and the fuel tank. As will be described in detail later, mating flanges on the fuel tank and the lower end of the filler tube can be secured by bolts and sealed with an O-ring or the like to form a strong and fluid-proof junction resistant to deformation in any direction. However, the upper end of the filler tube can only be sealed with a removable gas cap and can only be attached to a relatively weak outer body panel. Thus, in cases of severe body deformation, the sealing cap may be damaged.

Some attempts have already been made to remedy the situation. For example, a gas cap described in U.S. Pat. No. 4,142,756 to Henning et al comprises a handle loosely attached to a portion which mates with threads in a filler tube. If the handle is subjected to excessive forces, it breaks away, leaving the other portion in sealing contact with the filler tube. This arrangement also features a protective collar interposed between the sealing ring of the gas cap and the nearest part of the vehicle body to prevent direct contact therebetween in cases of body deformation.

While improving vehicle safety, this structure does have the drawback of allowing the gas cap assembly to be easily damaged. That is, when the handle separates as designed, it leaves the other portion lodged within the filler tube, necessitating troublesome removal and unnecessarily expensive replacement.

SUMMARY OF THE INVENTION

The object of the invention is to provide a fuel filler system for an automotive vehicle in which the removable cap sealing the free end of the filler tube is shielded from contact with the portion of the vehicle body through which the filler tube protrudes, even in cases of deformation of the vehicle body such as may occur in traffic accidents.

An additional object of the invention is to provide a safety shield for the filler tube which allows easy installation of same.

Yet another object of the invention is to provide a safety shield for the filler tube which forms a fluid-tight seal between the filler tube and the vehicle body.

These objects are fulfilled by adding a flange to the filler tube at a point between the removable fuel cap and the outer body panel. The flange inteferes with displacement of the edges of the body panel toward the fuel cap in traffic accidents. The flange may be threaded for convenient attachment to and detachment from the filler tube, facilitating installation and maintenance of the filler tube.

BRIEF DESCRIPTION OF THE DRAWINGS

The invention will be described in detail with reference to the following drawings in which like reference numerals denote like elements.

DETAILED DESCRIPTION OF THE PREFERRED EMBODIMENTS

Figure 1:
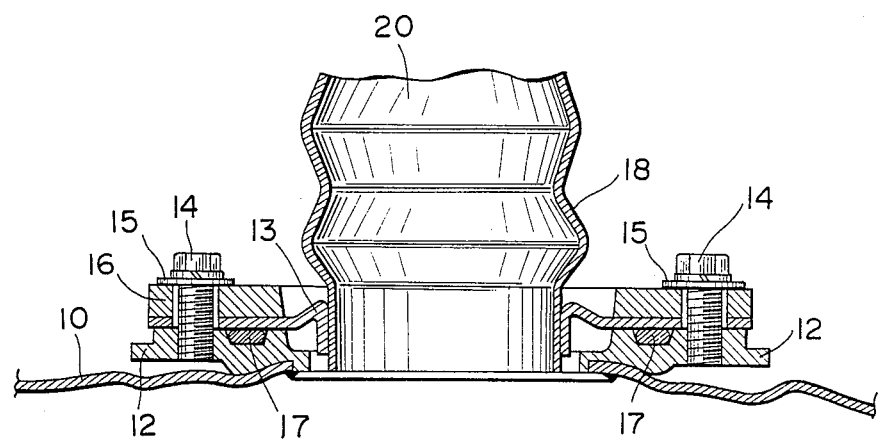
FIG. 1, a cross-section of a filler tube-fuel tank connection according to the present invention.

FIG. 1 shows a junction between a fuel tank 10 and a fuel filler tube or hose 20 according to the present invention. Flanges 12, 13 fixed to tank 10 and filler tube 20 respectively are clamped together by means of a plurality of bits 14 which engage threads in flange 12. Protective sleeves 15 and an annular spacer 16 protect flange 13 from damage due to the bolts 14. An O-ring or a similar seal or gasket 17 is clamped between the flange 12, 13 concentrically inside of the ring formed by the bolts 14 to fluid-proof the connection between tank 10 and filler tube 20.

The structure illustrated in FIG. 1 provides not only a fluid-proof connection between tank 10 and filler tube 20 but also a secure, deformation-resistant connection. The force of the bolts 14 ensures that the seam between the flanges 12, 13 will be on the same order of strength as the walls of the fuel tank 10 and filler tube 20 themselves. In addition, the proximity of the seal 17 to the bolts 14 preserves the integrity of the fluid-tight seal. Furthermore, corrugations 18 in the filler tube 20 allow flexure of the tube 20 without rupture. Thus, even if the illustrated structure is subjected to significant deformation in an automotive accident, the connection between the fuel tank and the fuel filler tube will remain sound. However, since the lower end of filler tube 20 is secured to fuel tank 10, the upper end will bear the brunt of displacements with respect to the rest of the vehicle body.

Figure 2:
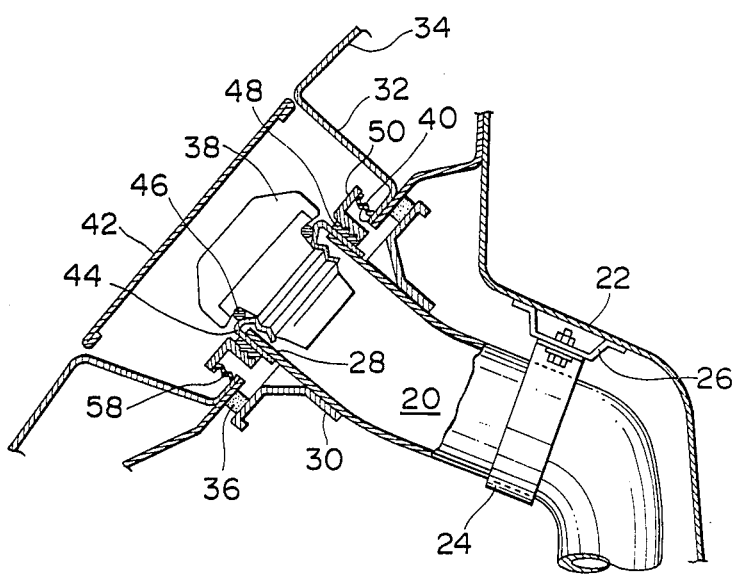
FIG. 2, a cross-section, partially cut away, of a filler tube-filler well connection according to the present invention.

Accordingly, the connection between the upper end of filler tube 20 and the vehicle body must be so constructed as to minimize the possibility of damage to the filler tube and associated elements due to vehicle body deformation. FIG. 2 shows such a connection in accordance with the preferred embodiment of the present invention.

In the preferred embodiment, filler tube 20 is secured to a wheelhouse panel 22 of the vehicle body by means of a circular clamp 24 and a bolt bracket 26. Nearer to the free end 28 of filler tube 20, an annular bracket 30 fixed concentrically to filler tube 20 is secured to the underside of a filler well 32 formed in a vehicle body outer panel 34 by means of a resilient annular seal 36.

The filler well 32 allows access to a gas cap 38, such as was described above, without disturbing the aerodynamics of the vehicle body. The floor of filler well 32 has an opening 40 through which the free end 28 of filler tube 20 extends and which is sealed from below by annular seal 36 and bracket 30. The filler well 32 is covered by a hinged cover 42 which lies flush with the outer contours of outer panel 34 when the filler tube system is not in use.

An insert 44 fits snugly over the free end 28 of filler tube 20. The insert 44 is annular and its inner periphery is threaded to match male threads on the gas cap 38. As is well known, the gap cap 38 is to be screwed into threaded insert 44 until it clamps an O-ring 46 or other suitable sealing element securely against the edge of the insert. This provides both secure engagement and a fluid-tight seal between the gas cap 38 and the free end 28 of filler tube 20.

Figure 3:
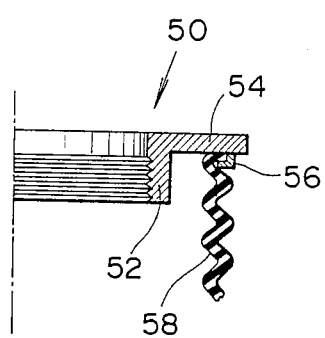
FIG. 3, an enlarged cross-section of part of the flange and outer seal of FIG. 2.

In addition, a male-threaded ring 48 is attached to the outer periphery of insert 44 such that the threads of the insert and the threaded ring 38 lie in approximately the same planes. A female-threaded, flanged ring 50 is designed to be screwed into secure engagement with the threaded ring 48. As shown clearly in FIG. 3, flanged ring 50, hereafter referred to as "flange 50", consists largely of a short ring 52 threaded on its inside surface and a wide flange 54 perpendicular to and integral with the ring 52. In addition, a tab 56 clips one edge of an annular, bellows-type seal 58 to the underside of flange 54. Tab 56 may be one of a plurality of tabs or there may be a continuous circular tab around ring 52. As can be seen in FIG. 2, bellows seal 58 is long enough to extend from flange 50 into sealing contact with the floor of filler well 32. The bellows seal need not be vulcanized or otherwise fixed to the filler well but rather can provide an adequate seal simply by resting loosely in contact therewith.

As seen in FIG. 2, the ring of annular section 52 is sufficiently long to face and oppose the inner peripheral edge of opening 40.

Figure 4:
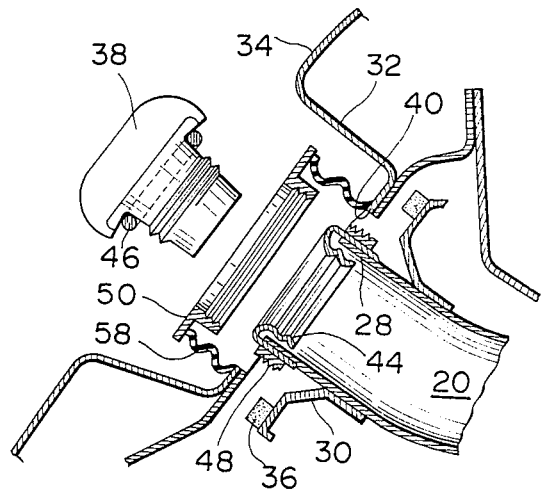
FIG. 4, an exploded view of the elements of FIG. 2 showing their relative positions during installation.

The flange 50 is also dimensioned that although the ring 52 may be smaller than the opening 40, the outer diameter of the flange 54 is greater than that of the opening. Thus, in the fully-assembled state shown in FIG. 2, both the annular bracket 30 and flange 50 overlap the edges of opening 40 on opposite sides of the floor of filler well 32. This juxtaposition is achieved without undue strain or flexure of any of the illustrated elements with the aid of the threaded engagement between ring 48 and flange 50. This will be explained in greater detail with reference to FIG. 4.

Before installation in the vehicle, insert 44 with ring 48 and bracket 30 with seal 36 are fixed in place on the filler tube 20. The filler tube assembly can then be attached to the fuel tank 10, the wheelhouse panel 22 and the underside of filler well 32 as described above. In this state, the insert 44 and the free end 28 of filler tube 20 project through opening 40 into the interior of filler well 32, allowing flange 50 to be screwed down into firm engagement with ring 48 from outside the vehicle body. Finally, the ring seal 46 can be applied to the gas cap 38 and the latter can be screwed into the insert 44.

Figure 5:
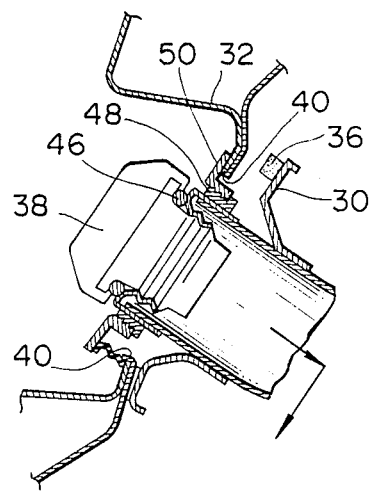
FIG. 5, a view similar to FIG. 2 taken under conditions of vehicle body deformation.

The advantage of having the flange 50 overlap the edges of opening 40 is best shown in FIG. 5. In this drawing, the filler tube has been subjected to forces acting along the arrows relative to the vehicle body. As a result, the filler tube has been wrenched clockwise so violently that bracket 30 and seal 36 have been detached from the underside of filler wall 32 where labelled. However, even under these severe conditions, the flange 50 effectively shields gas cap 38, ring seal 46 and insert 44 from contact with the edges of the opening 40. If the flange 50 were not in place, as is the case in conventional systems, the edge of the opening 40 might violently strike one of the aforementioned elements, damaging and necessitating replacement of the gas cap or even of the filler tube itself.

Figure 6:
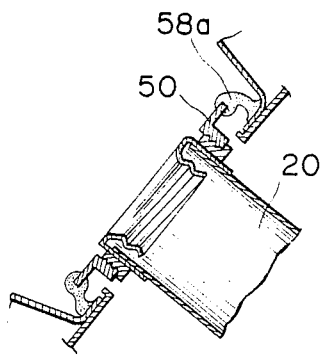
FIG. 6, a cross-section of essential features of a modification of the structure of FIG. 2.

Although the invention has been described in terms of a preferred embodiment, the scope of the invention is not limited to the features detailed above but rather is defined by the appended claims. Modifications of the structures illustrated and described above will occur to those of skill in the art in accordance to circumstance. For example, between as shown in FIG. 6, the bellows-type seal 58 may be replaced by a simpler annular seal 58a which can vulcanized directly to flange 50, obviating the need for tab 56.

What is claimed is:

1. A fuel filler system for an automotive vehicle comprising:
   a fuel tank;
   a filler well defined as a recess in the body of the vehicle and having an opening in an outer vehicle body panel;
   a fuel filler tube leading from the fuel tank, passing through said opening and opening outside the vehicle body within the filler well, the open end of the filler tube being sealed by a removable filler cap, said fuel filler tube being provided with a threaded section adjacent said opening end within said filler well;
   a flange having an internal threaded section engageable to said threaded section of said filler tube and extending parallel to the outer vehicle body panel between said opening and said filler cap, the diameter of said flange being greater than that of said opening, said flange being attachable to and detachable from said filler tube independently of other elements of the fuel filler system and having an annular section facing a peripheral edge of said opening in spaced apart relationship; and
   a seal, interpositioned between said annular section and said peripheral edge of said opening, for closing a clearance between said annular section and said peripheral edge of said opening and for preventing said flange from contacting said body panel.

2. The fuel filler system of claim 1 wherein said seal is a flexible seal and connects said flange and the outer body panel near said opening so as to form a fluid-tight seal between said flange and the outer body panel.

3. The fuel filler system of claim 2, wherein said flexible seal is free of structural loads between or among elements of the fuel filler system.

4. The fuel filler system of claim 3, wherein said flexible seal is an annular, elastic bellows fixed at one end to said flange, the other end thereof resting in contact with said filler well.

5. The fuel filler system of claim 4 further comprising a stabilizing bracket fixed to both the filler tube and the inside surface of the outer vehicle body panel near said opening.

6. The fuel filler system of claim 5, wherein said bracket is fixed to the outer body panel by way of a second flexible sealing member so as to form a fluid-tight seal between the filler tube and the outer body panel.

* * * * *